United States Patent
Kaipu et al.

(10) Patent No.: US 10,430,166 B2
(45) Date of Patent: Oct. 1, 2019

(54) RESOURCE INJECTION FOR APPLICATION WRAPPING

(71) Applicant: AirWatch LLC, Atlanta, GA (US)

(72) Inventors: Sandeep Naga Kaipu, Atlanta, GA (US); Xinpi Du, Atlanta, GA (US); Supriya Saha, Alpharetta, GA (US); Dipanshu Gupta, Atlanta, GA (US); Chaoting Xuan, Duluth, GA (US)

(73) Assignee: AIRWATCH LLC, Atlanta, GA (US)

( * ) Notice: Subject to any disclaimer, the term of this patent is extended or adjusted under 35 U.S.C. 154(b) by 86 days.

(21) Appl. No.: 15/258,247

(22) Filed: Sep. 7, 2016

(65) Prior Publication Data

US 2017/0286075 A1    Oct. 5, 2017

Related U.S. Application Data

(60) Provisional application No. 62/315,314, filed on Mar. 30, 2016.

(51) Int. Cl.
| | |
|---|---|
| *G06F 8/41* | (2018.01) |
| *G06F 8/53* | (2018.01) |
| *G06F 8/61* | (2018.01) |
| *G06F 21/57* | (2013.01) |

(52) U.S. Cl.
CPC .............. *G06F 8/41* (2013.01); *G06F 8/53* (2013.01); *G06F 8/61* (2013.01); *G06F 21/57* (2013.01)

(58) Field of Classification Search
CPC ........................................ G06F 8/41
USPC ........................................ 717/145
See application file for complete search history.

(56) References Cited

U.S. PATENT DOCUMENTS

| | | | | |
|---|---|---|---|---|
| 7,099,791 | B2 * | 8/2006 | Fritzsche | G01B 31/31837 702/119 |
| 7,765,539 | B1 * | 7/2010 | Elliott | G06F 8/53 717/145 |
| 2012/0233601 | A1 * | 9/2012 | Gounares | G06F 8/443 717/143 |
| 2015/0379023 | A1 * | 12/2015 | Shabtay | G06F 17/30076 707/756 |

* cited by examiner

*Primary Examiner* — Evral E Bodden
(74) *Attorney, Agent, or Firm* — Thomas Horstemeyer, LLP (57) ABSTRACT

Disclosed are various approaches for injecting resources into wrapped applications. A computing device first obtains a compiled version of a target application package. The computing device then decompiles the compiled version of the target application package to generate a source code version of the target application package. Then, the computing device combines the source code version of the target application package with management component source code. Next, the computing device generates an application resource index. Subsequently, the computing device, modifies the management component source code based at least in part on the application resource index. Finally, the computing device compiles the combined source code version of the target application package and the management component source code to generate a managed application package.

20 Claims, 4 Drawing Sheets

RESOURCE INJECTION FOR APPLICATION WRAPPING

CROSSREFERENCE TO RELATED APPLICATIONS

The application claims priority to and the benefit of U.S. Provisional Application No. 62/315,314, entitled "RESOURCE INJECTION FOR APPLICATION WRAPPING" and filed on Mar. 30, 2016, which is incorporated by reference as if set forth herein in its entirety.

BACKGROUND

In an enterprise setting, information technology (IT) departments can be tasked with managing mobile devices of users to ensure that these devices comply with one or more enterprise policies. If the mobile devices are owned by the enterprise, the IT department can install and configure application on the mobile devices to comply with the enterprise policies. For instances, the IT department can select and install applications that support specific encryption features, specific authentication features, or other features required by an enterprise policy. However, if the mobile devices are owned by the users themselves, this may not be possible. For instance, users may want to user their own, preferred applications installed on their devices.

To ensure that users preferred applications comply with enterprise policies, the IT department can use application wrapping techniques to add features to or remove features from individual applications installed on the client devices of the users. For example, using an application wrapping tool, an IT department could add features, such as encryption, user authentication, or other features, to a third-party application that lacks these features. As a result, the IT department can force third-party applications that users have installed on their mobile devices to comply with enterprise policies.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to application wrapping. In some examples, a management service can monitor and control the operation of client devices for an enterprise. A wrapping engine associated with the management service can obtain a target application package from a third party application developer. The wrapping engine can modify the target application package to provide the application package with a management component, which can include security components, authentication components, and proxying components. To this end, the wrapping engine can decompile the target application package and combine code and resources from the decompiled target application package with code and resources for the management component. The wrapping engine can also generate a resource index for the combination of the resources from the target application package and management component.

When generating the resource index, the wrapping engine can modify resource identifiers for the management component so that the resource identifiers for the management component do not conflict with resource identifiers for the target application package. In other words, the wrapping engine can ensure that respective resource identifiers for the target application package and management component are unique. The wrapping engine can also apply rules when modifying the resource identifiers for the management component so that the wrapping engine can properly compile the code for the management component and target application package.

The management service can then generate a managed application package that includes the combined components of the target application package and the management component. The management service can then compile the managed application package and distribute the managed application package to client devices that are managed by the management service. In this way, the management service can inject management components into third party applications. In addition, the management service can wrap the applications so that user interfaces for the management components are included in the applications.

In the following discussion, examples of systems and their components are described, followed by examples of the operation of those systems.

Figure 1:
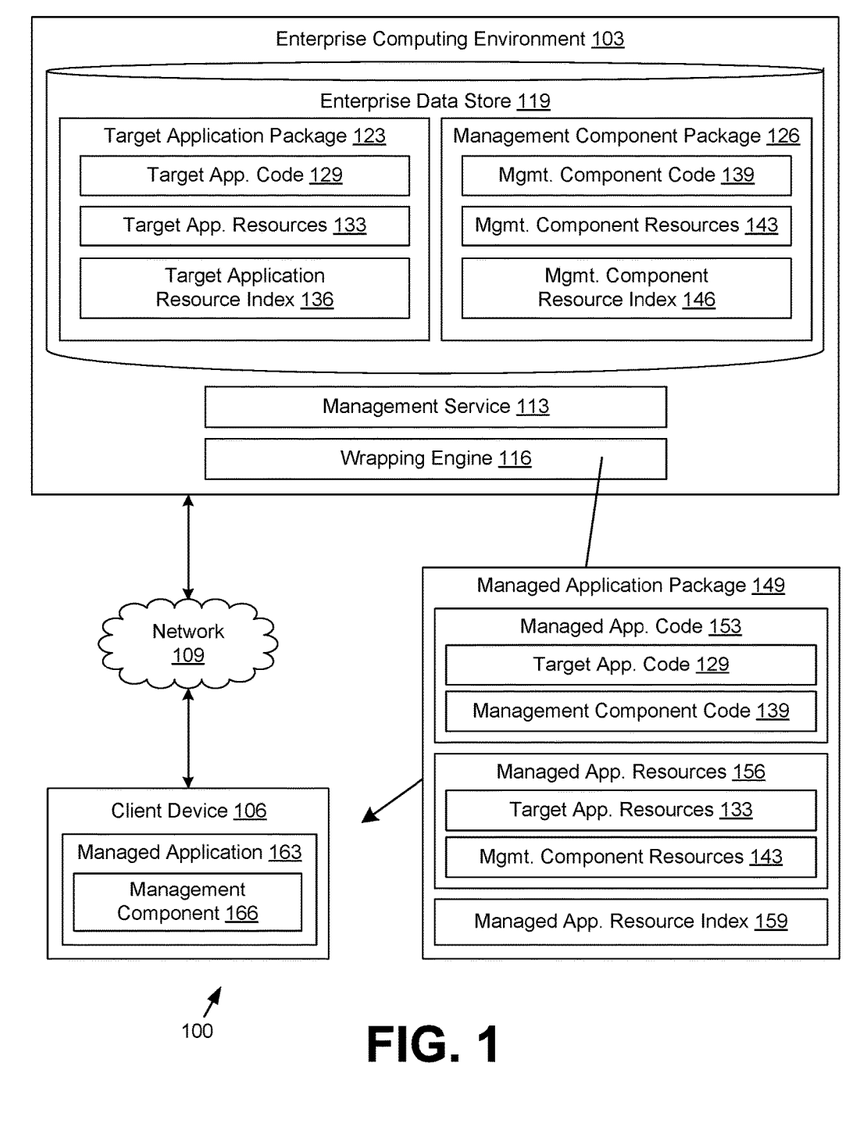
FIG. 1 is a drawing of a networked environment according to various embodiments of the present disclosure.

With reference to FIG. 1, shown is an example of a networked environment 100. The networked environment 100 can include an enterprise computing environment 103 and a client device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks, Ethernet networks, cellular networks, and telephony networks.

The enterprise computing environment 103 can be a computing system operated by one or more enterprises, such as a business or other organization. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 113 that can monitor and manage the operation of client devices 106 associated with the enterprise that operates the enterprise computing environment 103. In some examples, the management service 113 can manage and oversee the operation of multiple client devices 106 enrolled in a mobile device management service provided by the management service 113. The management service 113 can also provide the client devices 106 with access to email, calendar data, contact information, and other resources associated with the enterprise.

In addition, a wrapping engine 116 can be associated with the management service 113. The wrapping engine 116 can include a decompiler, a code injector, a resource injector, and a compiler. As will be described in further detail below, the wrapping engine 116 can wrap applications, including applications developed by a third party, to inject management components into the applications. Application wrapping can be a process of adding a management layer into an application while maintaining at least most of the original functionality of the application. Application wrapping can facilitate an enterprise deploying an application with added management and security features without requiring the developer of the application to modify code of the application. Examples of management and security features that can be wrapped into an application include components that authenticate the user of the client device 106 prior to facilitating particular functionality of the application and components that implement security protocols that the application would otherwise not implement. In addition, techniques described herein can be used to wrap user interfaces and user interface elements into applications.

The management service 113 can assign various compliance rules to respective client devices 106. The compliance rules can specify, for example, one or more conditions that must be satisfied for the client device 106 to be deemed compliant with the compliance rule. In various examples, the enterprise computing environment 103, the client device 106, or both the enterprise computing environment 103 and the client device 106 can determine whether the client device 106 satisfies a compliance rule. For example, the client device 106 can generate a data object that describes the state of the client device 106 along with associated information, settings, and parameters. Components in the client device 106 or the management service 113 can evaluate the data object to determine whether the client device 106 is compliant with corresponding compliance rules.

In one example, a compliance rule can specify that particular applications must be or are prohibited from being installed in the client device 106. For instance, the compliance rule could specify that an application has been blacklisted or is classified as malware (e.g., a virus, a trojan, a worm, etc.). If this compliance rule were triggered, the management service 113 could cause the client device 106 to sending a notification to the user that the prohibited application is installed on the client device 106. The management service 113 could also cause the client device 106 to uninstall the prohibited application or replace the prohibited application with an approved version of the application. In other instances, the management service 113 could also cause the client device 106 to perform an "enterprise wipe," which causes the client device 106 to reset itself to the same state as when it left the factory by deleting all user-installed applications, deleting all user settings, and deleting any other user data on the client device 106.

In another example, a compliance rule can specify that a lock screen is required to be generated when the client device 106 is "awoken" from a low power "sleep" state and that a passcode is required for a user to unlock the lock screen.

Various compliance rules can be based on time, geographical location, or device and network properties. For instance, the client device 106 can satisfy a compliance rule when the client device 106 is located within a particular geographic location, such as an area defined by a particular boundary (e.g., a geo-fence). The client device 106 can also satisfy a location based compliance rule when the client device 106 is in communication with a particular local area network, such as a particular local area network that is managed by the enterprise computing environment 103 (e.g. a Wi-Fi network).

If the client device 106 is not within an allowed geographic area, the management service 113 can cause the client device 106 to perform one or more remedial actions. For instance, the management service 113 could cause the client device 106 to lock itself while it is outside the approved area, thereby rendering itself unusable until it is returned to an approved or authorized location. In another instance, the management service 113 could prevent the client device 106 from accessing particular resources (e.g., an application server or service) until the client device 106 is returned to an approved or authorized area. In an example implementation, a compliance rule can specify that the client device 106 must be located in a secured location, such as the premises of the enterprise that operates the enterprise computing environment 103, in order for the client device 106 to be authorized to access or render content in the client device 106.

Similarly, a compliance rule in can specify a time or date that the client device 106 generally or individual applications installed on the client device 106 specifically can be used. For example, if the compliance rule is triggered, the client device 106 can block access to particular services or refuse to execute particular applications specified by the compliance rule. As another example, the client device 106 could lock itself to prevent a user from accessing or using the client device 106 during the time or on the date specified by the compliance rule.

Another example of a compliance rule involves whether a user belongs to a particular user group. For instance, a compliance rule can include a whitelist or a blacklist that specifies whether particular users or groups of users are authorized to perform various functionality, such as installing or executing a particular application. If a user is included in a blacklisted group, the client device 106 may refuse to provide access to resources specified in the compliance rule or to execute an application specified in the compliance rule on behalf of the user. Likewise, the client device can be configured to refuse to provide access to resources specified in the compliance rule or to execute applications specified in the compliance rule for any user except those included in a whitelist.

As illustrated in some of these examples, an enterprise can operate the management service 113 to ensure that the client devices 106 of its users satisfy respective compliance rules. By ensuring that the client devices 106 of its users are operating in compliance with the compliance rules, the enterprise can control access to resources and thereby improve the security of devices associated with the enterprise and the users of the client devices 106.

The enterprise computing environment 103 can also include an enterprise data store 119. The enterprise data store 119 can be representative of multiple enterprise data stores 119 accessible by components in the networked environment 100. The enterprise data store 119 can store various data associated with the enterprise computing environment 103. For example, the enterprise data store 119 can store a target application package 123 and a management component package 126.

The target application package 123 can be a collection of files and other data that, when installed in the client device, generates an executable application. For example, the client device 106 can install the target application package 123 to create a word processing application, an email application, or an image rendering application. In some examples, the target application package 123 can be an ANDROID application package (APK) having the .apk filename extension. The target application package 123 illustrated in FIG. 1 is an example of a decompiled application package. The target application package 123 can include target application code 129, target application resources 133, and a target application resource index 136.

The target application code 129 can be human-readable code, such as JAVA code. The target application resources 133 can be assets invoked by the target application code 129 when executed. For example, the target application resources 133 can include bitmaps, layout definitions, user interface strings, menus, drawables, animation instructions, color state lists, strings, and styles.

The target application resource index 136 can include information regarding the target application resources 133 for the target application package 123. For example, the target application resource index 136 can list the target application resources 133. In addition, the target application resource index 136 can specify the resource type, resource name, and a resource identifier. In some examples, the target application resource index 136 can include an extensible markup language (XML) file that specifies information for the target application resources 133 in respective XML elements. The target application resource index 136 can be the public.xml file in an ANDROID APK.

As an example, an XML element representing information for a particular target application resource 133 can read: "<public type="drawable" name="ic_launcher" id="0x7f020000"/>." The foregoing XML element indicates that the target application resource 133 having the name "ic_launcher" is a "drawable" type of resource assigned the resource identifier of "7f020000" represented in hexadecimal format. The target application resources 133 can have the predefined format of PPTTNNNN, where PP is the predefined value of "7f," TT is a resource type code representing the resource type, and NNNN is a resource type index, represented in hexadecimal format. Thus, the foregoing example XML element indicates that all drawable type resources for the target application package 123 are assigned the resource type code of "02," represented in hexadecimal format. In addition, the example XML element shows that the "ic_launcher" resource is the first identified drawable resource, as indicated by its resource type index of "0000." A subsequent drawable resource for the target application package 123 could have the resource type code of "0001." In addition, a color type of resource can be assigned the resource identifier of "0x7f03000," indicating that all color resources have the resource type code of "03," represented in hexadecimal format.

The management component package 126 can be a collection of files and other data that provides a management layer for incorporation into an application. The management component package 126 can include management component code 139, management component resources 143, and a management component resource index 146. The management component code 139 can be human-readable code for the management component, and the management component resources 143 can be assets invoked by the management component code 139. The management component resource index 146 can include information regarding the management component resources 143. The management component resource index 146 can be formatted similar to, and include similar types of information as, the target application resource index 136.

As will be described in further detail below, the wrapping engine 116 can wrap the target application package 123 to generate a managed application package 149. The managed application package 149 can include files and other data that, when installed in the client device 106, provides functionality based on the target application package 123 and the management component package 126. The managed application package 149 can include managed application code 153, managed application resources 156, and a managed application resource index 159.

The managed application code 153 can be human-readable code, such as JAVA code. As will be described in further detail, the managed application code 153 can include at least a portion of the target application code 129 and the management component code 139. The managed application resources 156 can include assets invoked by the managed application code 153 when executed. As such, the managed application resources 156 can include at least a portion of the target application resources 133 and the management component resources 143.

The managed application resource index 159 can include information regarding the managed application resources 156. The managed application resource index 159 can be formatted similar to, and include similar types of information as, the target application resource index 136 and management component resource index 146.

The client device 106 can be representative of multiple client devices 106 that can be coupled to the network 109. The client device 106 can include a processor-based computer system, such as a desktop computer, a laptop computer, a personal digital assistant, a mobile phone, or a tablet computer.

The client device 106 can include a managed application 163. The managed application 163 can be an application installed in the client device 106 upon installation of the managed application package 149. The managed application 163 can perform various functionality based on the target application package 123 and the management component package 126. For example, if the target application package 123 provides a word processing application, the managed application 163 can be a managed version of the word processing application. The managed application 163 can include a management component 166 based on the management component package 126. The management component 166 can monitor activity and settings in managed application 163. The management component 166 can also configure settings in the managed application 163. In addition, the management component 166 can determine whether the managed application 163 and other components in the client device 106 satisfy compliance rules assigned to the client device 106.

Furthermore, the management component 166 can perform authentication functionality for the managed application 163. For example, the management component 166 can generate user interfaces and execute code that requires the user of the client device 106 to be authenticated before functionality based on the target application package 123 is executed. For instance, the management component 166 can authenticate the user based on access credentials, such as a user name and password, prior to allowing the managed application 163 to access and render email messages. In addition, the management component 166 can disable functionality of the managed application 163 in response to detecting that the managed application 163 or other components in the client device 106 violate a compliance rule. As another example, the management component 166 can initiate and require the managed application 163 to use a virtual private network (VPN) tunnel to access components in the enterprise computing environment 103.

Figure 2:
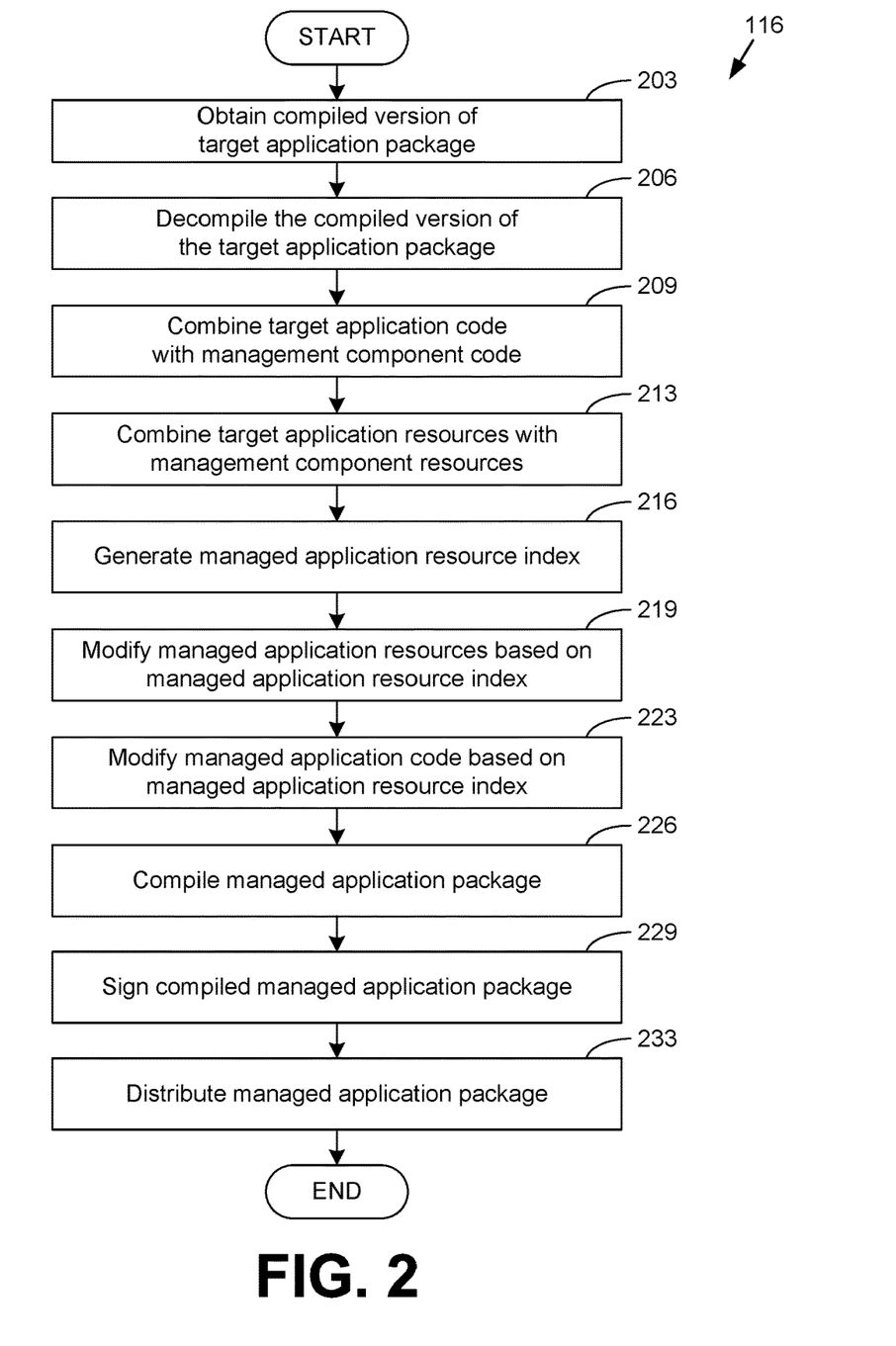
FIG. 2 is a flowchart illustrating one example of functionality implemented as portions of an application executed in the networked environment of FIG. 1 according to various embodiments of the present disclosure.

With reference to FIG. 2, shown is a flowchart that provides an example of a portion of the operation of the wrapping engine 116. In particular, FIG. 2 provides an example of the wrapping engine 116 wrapping a target application package 123 so that the resulting managed application 163 includes the management component 166. The flowchart of FIG. 2 can be viewed as depicting an example of a method implemented in the enterprise computing environment 103.

Beginning with step 203, the wrapping engine 116 can obtain a compiled version of the target application package 123. In some examples, the developer of the target application package 123 can transmit the target application package 123 to the wrapping engine 116 with a request for the wrapping engine 116 to wrap the target application package 123. In another example, the wrapping engine 116 can retrieve the target application package 123 from a public application repository, such as the GOOGLE PLAY STORE application repository. In another example, the user of the client device 106 can request that the wrapping engine 116 retrieve the target application package 123 from an application repository and wrap the application.

As shown at step 206, the wrapping engine 116 can decompile the compiled version of the target application package 123. To this end, the wrapping engine 116 can provide the target application package 123 to a decompiler included in the wrapping engine 116. The output of the decompiler can include the target application code 129, the target application resources 133, and the target application resource index 136, as illustrated in FIG. 1.

At step 209, the wrapping engine 116 can combine the target application code 129 from the decompiled target application package 123 with the management component code 139 from the management component package 126 to generate the managed application code 153. In some examples, combining the target application code 129 with the management component code 139 can involve inserting functions from the management component code 139 into the target application code 129. For example, the wrapping engine 116 can insert authentication functions from the management component code 139 into the target application code 129 so the resulting managed application 163 can require the user of the client device 106 to be authenticated before functions of the target application code 129 are executed.

In other examples, combining the target application code 129 with the management component code 139 can involve replacing functions from the target application code 129 with functions from the management component code 139. For example, if the wrapping engine 116 detects that the target application code 129 includes a function that establishes communication with a remote computing device, the wrapping engine 116 can replace the function with a corresponding function in the management component code 139 that establishes communication with the remote computing device using a particular encryption protocol.

In addition, the wrapping engine 116 can remove functions from the target application code 129. For example, a compliance rule can specify that the managed application 163 is prohibited from storing files with a particular remote storage provider. If the wrapping engine 116 detects that a particular function facilitates storing files with the remote storage provider, the wrapping engine 116 can remove the function and thereby prevent this functionality from being provided in the resulting managed application 163.

As shown at step 213, the wrapping engine 116 can then combine the target application resources 133 with the management component resources 143 to generate the managed application resources 156. For example, the wrapping engine 116 can store the target application resources 133 and management component resources 143 in a particular file directory for the managed application package 149. In some examples, the wrapping engine 116 can determine which particular management component resources 143 are used for the managed application code 153 and include only the management component resources 143 that are determined to be used.

The wrapping engine 116 can then move to step 216 and generate the managed application resource index 159. To properly compile the managed application package 149, each managed application resource 156 may be required to have a unique resource identifier specified in the managed application resource index 159. Thus, the wrapping engine 116 can ensure that each managed application resource 156 is associated with a unique resource identifier in the managed application resource index 159. As will be described in further detail with respect to FIGS. 3A-3B, the wrapping engine 116 can modify the resource identifiers for management component resources 143 that are specified in the managed application resource index 159 so that each managed component resource 143 and target application resource 133 has a unique resource identifier. In other words, if a target application resource 133 has a resource identifier of "0x7f020044," and a management component resource 143 has a resource identifier of "0x7f020044," the wrapping engine 116 can modify the resource identifier of the management component resource 143 so that the resource identifier is unique and does not conflict with the resource identifier of the target application resource 133. For example, the wrapping engine 116 can modify the resource identifier of the management component resource 143 from "0x7f020044" to "0x7f040000."

As shown at step 219, the wrapping engine 116 can then modify the managed application resources 156 based on the generated managed application resource index 159. For example, the management component resources 143 in the managed application resources 156 can include, reference, or be referenced by their previous resource identifier. As such, the wrapping engine 116 can parse the managed application resources 156 and replace the resource identifiers that were modified in step 216 with the updated resource identifiers.

Similarly, at step 223, the wrapping engine 116 can modify the managed application code 153 based on the managed application resource index 159, as indicated at step 223. For example, the management component code 139 can include or reference management component resources 143 by resource identifiers that the wrapping engine 116 modified at step 216. As such, the wrapping engine 116 can parse the managed application code 153 and replace the resource identifiers that were modified in step 216 with the updated resource identifiers.

As step 226, the wrapping engine 116 can then compile the managed application package 149. As described above, wrapping engine 116 can include a compiler. As such, the wrapping engine 116 can provide the compiler with the managed application code 153, managed application resources 156, and managed application resource index 159 as inputs to the compiler. The output of the compiler can be a compiled version of the managed application package 149 that the client device 106 can install.

The wrapping engine 116 can then sign the compiled managed application package 149, as shown at step 229. The enterprise computing environment 103 can store a private key that is uniquely associated with the enterprise that operates the enterprise computing environment 103. When the managed application package 149 is signed with the private key, it can indicate that the enterprise has compiled the managed application package 149.

As shown at step 233, the wrapping engine 116 can then distribute the managed application package 149. In some examples, the wrapping engine 116 can provide the managed application package 149 to a public application repository from which client devices 106 can obtain the managed application package 149 for installation. In other examples, the wrapping engine 116 can provide the managed application package 149 to a private application repository that is accessible to only client devices 106 registered with the management service 113. In other examples, the wrapping engine 116 can push the managed application package 149 to the client device 106 and require the client device 106 to install the managed application package 149. Thereafter, the process can end.

Figure 3A:
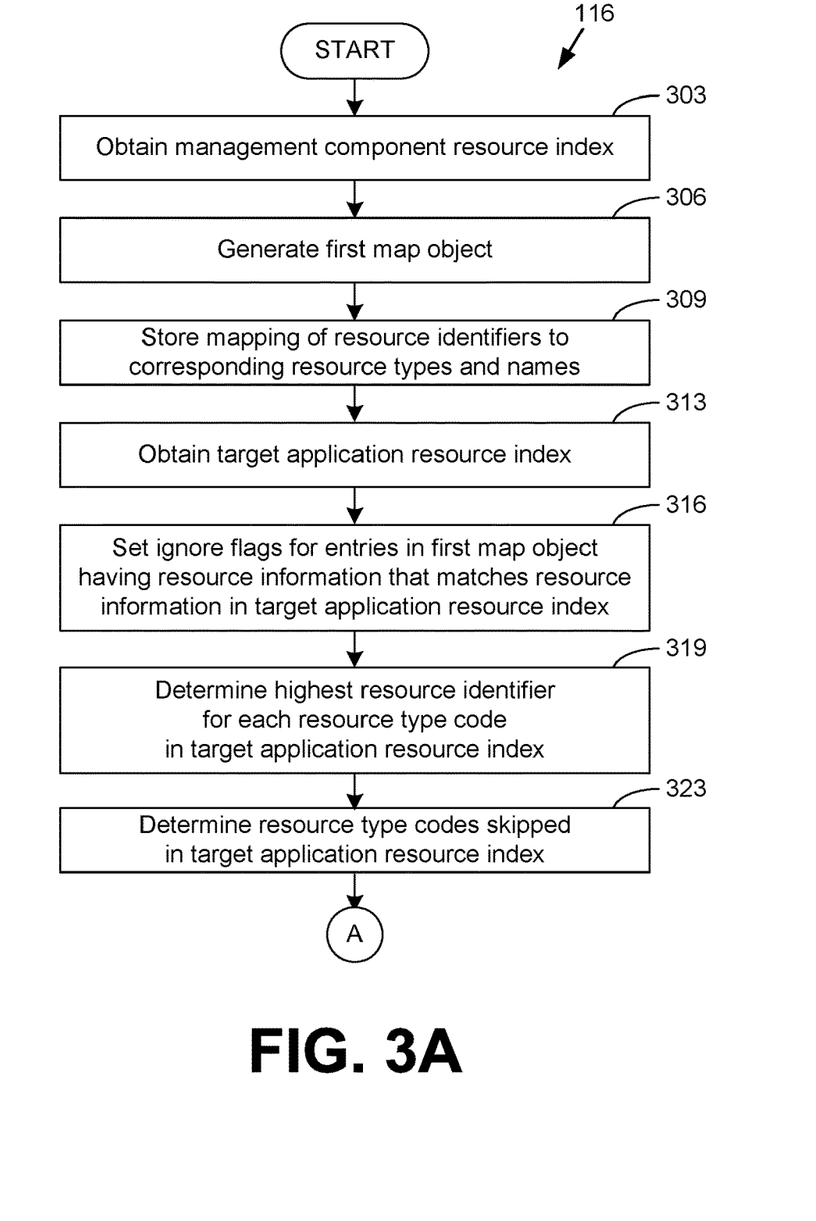
FIGS. 3A and 3B are a flowchart illustrating one example of functionality implemented as portions of an application executed in the networked environment of FIG. 1 according to various embodiments of the present disclosure.
Figure 3B:
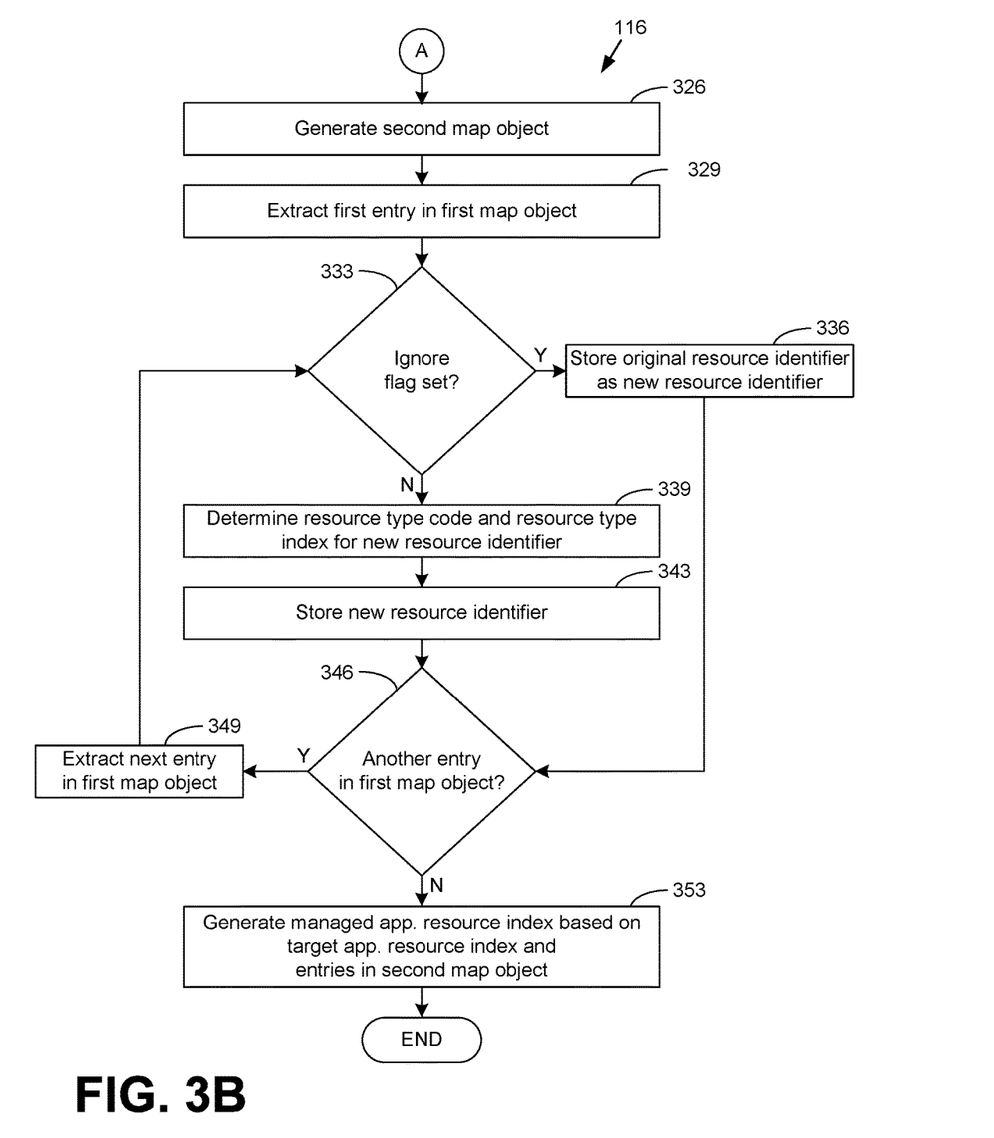

With reference to FIGS. 3A-3B, shown is a flowchart that provides an example of a portion of the operation of the wrapping engine 116. In particular, FIGS. 3A-3B provide an example of the wrapping engine 116 generating a managed application resource index 159. The flowchart of FIG. 1 can be viewed as depicting an example of a method implemented in the enterprise computing environment 103.

Beginning with step 303, the wrapping engine 116 can obtain the management component resource index 146. As described above, the management component resource index 146 can include information regarding the management component resources 143 represented in the form of XML elements. For instance, an XML element representing information for a particular management component resource 143 can read: "<public type="color" name="red" id="0ox7f080019"/>." This XML element can indicate that the management component resource 143 named "red" is a "color" type of resource having the resource identifier of "080019," as represented in hexadecimal format.

At step 306, the wrapping engine 116 can generate a first map object. The first map object can be an ANDROID HashMap class, which can be a data structure including a set of "keys" and "values." Each key of the ANDROID HashMap class can be mapped to a particular value.

As shown at step 309, the wrapping engine 116 can store a mapping of resource identifiers for management component resources 143 to their respective resource types and resource names, as indicated by the management component resource index 146. Thus, for the "red" XML entry above, the resource identifier of "0x080019" can be mapped to the resource type "color" and resource name "red." The wrapping engine 116 can map the resource identifier to the resource type and name for each entry in the management component resource index 146. In examples in which an ANDROID HashMap is used, the key for the HashMap can include the resource type concatenated with the resource name for a particular management component resource 143, and the HashMap value for the key can include the corresponding resource identifier and resource type.

At step 313, the wrapping engine 116 can obtain the target application resource index 136. As discussed above, the target application resource index 136 can include information regarding the target application resources 133 represented in the form of XML elements.

As shown at step 316, the wrapping engine 116 can set ignore flags for entries in the first map object having resource information that matches resource information in the target application resource index 136. For example, if the resource identifier, resource type, and resource name for a management component resource 143 represented in the first map object, match information for a target application resource 133 represented in the target application resource index 136, the wrapping engine 116 can set an ignore flag for the entry in the first map object. As will be seen below, the ignore flag can notify the wrapping engine 116 that the wrapping engine 116 should not determine a new resource identifier for the corresponding management component resource 143.

At step 319, the wrapping engine 116 can determine the highest value for a resource identifier for each resource type code included in the target application resource index 136. For example, if the only resource identifiers for a particular type of resource include "0x7f030000," "0x7f030001," and "0x7f030002," the wrapping engine 116 can determine that the highest resource identifier for the particular type of resource is "0x7f030002."

At step 323, the wrapping engine 116 can determine any resource type codes skipped in the target application resource index 136. For example, if the resource type codes of "01," "02," and "04" are represented in the target application resource index 136, the wrapping engine 116 can determine that the resource type code of "03" is skipped in the target application resource index 136.

The wrapping engine 116 can then move to step 326, which is shown in FIG. 3B. At step 326, the wrapping engine 116 can generate a second map object. The second map object can be an ANDROID HashMap. As will be seen, the wrapping engine 116 can use the second map object to store a mapping of the original resource identifiers to newly generated resource identifiers for the management component resources 143.

At step 329, the wrapping engine 116 can extract the first entry representing information for a management component resource 143 in the first map object. As discussed above, the entries in the first map object can map resource identifiers for management component resources to their respective resource types and resource names. In addition, the entry can indicate whether the wrapping engine 116 set the ignore flag, as described above with respect to step 316.

As shown at step 333, the wrapping engine 116 can determine whether the ignore flag for the first entry is set. If the ignore flag is set, the wrapping engine 116 can determine that it does not need to determine a new resource identifier for the corresponding management component resource 143. Thus, at step 336, the wrapping engine 116 can store the original resource identifier as the new resource identifier for the management component resource 143.

If the ignore flag is not set, the wrapping engine 116 can move to step 339 and determine the resource type code and resource type index for the new resource identifier of the management component resource 143. In various examples, the wrapping engine 116 can apply rules to determine the new resource identifier. For example, one rule can specify that all resources being of the "attribute" type must have the resource type code of "01," as represented in hexadecimal format. Another rule can specify that if a resource type code is used in the target application resource index 136 for a particular type of resource, all management component resources 143 of the same type must have the same resource type code. For example, if "color" resources are assigned the resource type code of "08" in the target application resource index, 136, the wrapping engine 116 can determine that all "color" resources will also have the "08" resource type code.

Another rule can specify that if resource type codes are skipped in the target application resource index 136, any additional resource type codes used must use the skipped resource type codes before other additional resource type codes are used. Thus, if the resource type code of "03" is skipped in the target application resource index 136, the wrapping engine 116 can determine that the next newly generated type code will be "03."

Another example of a rule can be that all resource type codes must be below a predefined number, such as "ff," as represented in hexadecimal format, to prevent a data overflow error. Furthermore, another rule can specify that the resource type index for a resource must be the number subsequent from the highest existing resource type index for the type of resource. Thus, if the highest resource type index for "color" target application resources 133 is "0034," the wrapping engine 116 can determine that the next "color" management component resource 143 will become "0035," as represented in hexadecimal format.

Once the wrapping engine 116 determines the resource type code and resource type index for the new resource identifier, the wrapping engine 116 can store the new resource identifier in association with the old resource identifier in the second map object, as shown at step 343. For example, if the wrapping engine 116 determines the use the resource type code of "03" and the resource type index of "0482," the wrapping engine 116 can apply the PPTTNNNN format discussed above and store the new resource identifier of "0x7f030482" in association with the old resource identifier of the management component resource 143.

As shown at step 346, the wrapping engine 116 can determine if there is another entry in the first map object. If so, the wrapping engine 116 can extract the next entry in the first map object, as shown at step 349, and repeat the process as shown and described above. The wrapping engine 116 can also arrive at step 346 subsequent to step 336, as shown in FIG. 3B. Thus, the wrapping engine 116 can generate a mapping of old resource identifiers to new resource identifiers for each management component resource 143.

Then, as shown at step 353, the wrapping engine 116 can generate the managed application resource index 159 based on the target application resource index 136 and the entries in the second map object. For example, the wrapping engine 116 can add the new resource identifiers, as shown in the second map object, and the information from the target application resource index 136 to generate the managed application resource index 159. Thereafter, the process can end.

The flowcharts discussed above show examples of the functionality and operation of implementations of components described herein. The components of the networked environment 100 described herein can be embodied in hardware, software, or a combination of hardware and software. If embodied in software, each step in the flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the flowcharts discussed above show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103 and client device 106 can each include at least one processing circuit. The processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the wrapping engine 116 can be stored in one or more storage devices and be executable by one or more processors. Also, the enterprise data store 119 can be located in the one or more storage devices.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

We claim:

1. A system for injecting resources into a wrapped application, comprising:
   a computing device comprising a processor and a memory; and
   an application stored in the memory that, when executed by the processor, causes the computing device to at least:
      obtain a compiled version of a target application package;
      decompile the compiled version of the target application package to generate a source code version of the target application package;
      replace a first function in the source code version of the target application package with a second function from source code of a management component to generate a modified version of the source code version of the target application package;
      generate an application resource index that comprises a first application resource from the target application package and a second application resource from the management component;
      modify the source code of the management component based at least in part on the application resource index; and
      compile the combined source code version of the target application package and the source code of the management component to generate a managed application package.

2. The system of claim 1 for injecting resources into the wrapped application, wherein the application, when executed by the processor, further causes the computing device to at least:
   combine the source code version of the target application package with management component resources;
   modify the management component resources based at least in part on the application resource index; and
   further compile the combined source code version of the target application package and the source code of the management component with the management component resources to generate the managed application package.

3. The system of claim 1 for injecting resources into the wrapped application, wherein the application, when executed by the processor, further causes the computing device to at least cryptographically sign the managed application package.

4. The system of claim 1 for injecting resources into the wrapped application, wherein the application, when executed by the processor, further causes the computing device to at least send the managed application package to a client device.

5. The system of claim 1 for injecting resources into the wrapped application, wherein the application, when executed by the processor to cause the computing device to generate the application resource index, further causes the computing device to at least:
   generate a first map object comprising a first resource identifier corresponding to a resource type and a resource name of the first application resource;
   remap the first resource identifier to a second resource identifier that corresponds to the resource type and the resource name of the first application resource;
   generate a second map object comprising the second resource identifier; and
   generate the application resource index based at least in part on the second map object.

6. The system of claim 1 for injecting resources into the wrapped application, wherein the source code of the management component provides additional application functions missing from the target application package and the application, when executed by the processor, further causes the computing device to insert a third function from the source code of the management component into the target application package.

7. The system of claim 1 for injecting resources into the wrapped application, wherein the compiled version of the target application package is obtained from a public application repository.

8. A method for injecting resources into a wrapped application, comprising:
   obtaining, by a computing device, a compiled version of a target application package;
   decompiling, by the computing device, the compiled version of the target application package to generate a source code version of the target application package;
   replacing, by the computing device, first function in the source code version of the target application package with a second function from source code of a management component to generate a modified version of the source code version of the target application package;
   generating, by the computing device, an application resource index that comprises a first application resource from the target application package and a second application resource from the management component;
   modifying, by the computing device, the source code of the management component based at least in part on the application resource index; and
   compiling, by the computing device, the combined source code version of the target application package and the source code of the management component to generate a managed application package.

9. The method of claim 8 for injecting resources into the wrapped application, further comprising:
   combining, by the computing device, the source code version of the target application package with management component resources;
   modifying, by the computing device, the management component resources based at least in part on the application resource index; and
   further compiling, by the computing device, the combined source code version of the target application package and the source code of the management component with the management component resources to generate the managed application package.

10. The method of claim 8 for injecting resources into the wrapped application, further comprising cryptographically signing, by the computing device, the managed application package.

11. The method of claim 8 for injecting resources into the wrapped application, further comprising sending, by the computing device, the managed application package to a client device.

12. The method of claim 8 for injecting resources into the wrapped application, further comprising
- generating, by the computing device, a first map object comprising a first resource identifier corresponding to a resource type and a resource name of the first application resource;
- remapping, by the computing device, the first resource identifier to a second resource identifier that corresponds to the resource type and the resource name of the first application resource;
- generating, by the computing device, a second map object comprising the second resource identifier; and
- generating, by the computing device, the application resource index based at least in part on the second map object.

13. The method of claim 8 for injecting resources into the wrapped application, wherein the source code of the management component provides additional application functions missing from the target application package and the method further comprises inserting a third function from the management component source code into the target application package.

14. The method of claim 8 for injecting resources into the wrapped application, wherein the compiled version of the target application package is obtained from a public application repository.

15. A non-transitory computer readable medium comprising a plurality of machine-readable instructions for injecting resources into a wrapped application that, when executed by a processor of a computing device, cause the computing device to at least:
- obtain a compiled version of a target application package;
- decompile the compiled version of the target application package to generate a source code version of the target application package;
- insert a function into the source code version of the target application package from the management component source code;
- generate an application resource index that comprises a first application resource from the target application package and a second application resource from the management component;
- modify the source code of the management component based at least in part on the application resource index; and
- compile the combined source code version of the target application package and the source code of the management component to generate a managed application package.

16. The non-transitory computer readable medium of claim 15, wherein the plurality of machine-readable instructions for injecting resources into the wrapped application, when executed by a processor of a computing device, cause the computing device to at least:
- combine the source code version of the target application package with management component resources;
- modify the management component resources based at least in part on the application resource index; and
- further compile the combined source code version of the target application package and the source code of the management component with the management component resources to generate the managed application package.

17. The non-transitory computer readable medium of claim 15, wherein the plurality of machine-readable instructions for injecting resources into the wrapped application, when executed by a processor of a computing device, cause the computing device to at least cryptographically sign the managed application package.

18. The non-transitory computer readable medium of claim 15, send the managed application package to a client device.

19. The non-transitory computer readable medium of claim 15, wherein the plurality of machine-readable instructions for injecting resources into the wrapped application, when executed by a processor of a computing device, cause the computing device to at least
- generate a first map object comprising a first resource identifier corresponding to a resource type and a resource name of the first application resource;
- remap the first resource identifier to a second resource identifier that corresponds to the resource type and the resource name of the first application resource;
- generate a second map object comprising the second resource identifier; and
- generate the application resource index based at least in part on the second map object.

20. The non-transitory computer readable medium of claim 15, wherein the compiled version of the target application package is obtained from a public application repository.

* * * * *